(12) United States Patent
Song et al.

(10) Patent No.: US 8,654,876 B2
(45) Date of Patent: Feb. 18, 2014

(54) TRANSMITTING APPARATUS IN MULTIPLE INPUT MULTIPLE OUTPUT SYSTEM

(75) Inventors: Young Seog Song, Daejeon (KR); Choongil Yeh, Daejeon (KR); Dong Seung Kwon, Daejeon (KR); Min Sik Seo, Daejeon (KR); Joondoo Kim, Seoul (KR); Jiwon Kang, Incheon (KR); Chungyong Lee, Seoul (KR)

(73) Assignees: Samsung Electronics Co., Ltd., Suwon-Si (KR); Electronics and Telecommunications Research Institute, Daejeon (KR)

( * ) Notice: Subject to any disclaimer, the term of this patent is extended or adjusted under 35 U.S.C. 154(b) by 305 days.

(21) Appl. No.: 13/132,915

(22) PCT Filed: Nov. 24, 2009

(86) PCT No.: PCT/KR2009/006932
§ 371 (c)(1),
(2), (4) Date: Jun. 4, 2011

(87) PCT Pub. No.: WO2010/064804
PCT Pub. Date: Jun. 10, 2010

(65) Prior Publication Data
US 2011/0243273 A1    Oct. 6, 2011

(30) Foreign Application Priority Data

Dec. 4, 2008 (KR) .................. 10-2008-0122741
Aug. 31, 2009 (KR) .................. 10-2009-0081445

(51) Int. Cl.
*H04B 7/02* (2006.01)
(52) U.S. Cl.
USPC ........... 375/267; 375/296; 375/285; 375/260; 375/233

(58) Field of Classification Search
USPC ........................................... 375/267
See application file for complete search history.

(56) References Cited

U.S. PATENT DOCUMENTS 6,909,807 B2 * 6/2005 Chu et al. ............ 382/232
7,369,511 B2 * 5/2008 Utsunomiya et al. ......... 370/252
(Continued)

FOREIGN PATENT DOCUMENTS

DE    10 2004 013 866 A1    10/2005
KR    20060064501 A    6/2006
(Continued)

OTHER PUBLICATIONS

International Search Report dated Jun. 1, 2011 in connection with International Appl. No. PCT/KR2009/006932.

(Continued)

*Primary Examiner* — Lihong Yu (57) ABSTRACT

Provided are a transmitting apparatus and a transmitting method in a multiple input multiple output system. A power allocation controller includes a block Tomlinson-Harashima precoder (BTHP) that precodes and outputs data to be transmitted to each user in a nonlinear scheme. The BTHP removes and outputs inference signals from data for each user based on the channel information that is fed back from the users. The data for each user output from the BTHP are allocated with power by the power allocation controller. The power allocation controller calculates power allocation parameters so that receiving minimum distances at receiving ends for each user that receive data through the MIMO antennas are the same, and allocates the calculated parameters to data for each user.

20 Claims, 5 Drawing Sheets

(56) References Cited

U.S. PATENT DOCUMENTS

| | | |
|---|---|---|
| 7,711,066 B2 | 5/2010 | Jiang et al. |
| 7,760,390 B2 | 7/2010 | Wen et al. |
| 7,787,555 B2 | 8/2010 | Kim et al. |
| 7,991,066 B2 | 8/2011 | Lee et al. |
| 2008/0112504 A1* | 5/2008 | Jiang et al. .................. 375/296 |

FOREIGN PATENT DOCUMENTS

| | | |
|---|---|---|
| KR | 10-0678167 | 1/2007 |
| KR | 10-2007-0085471 | 8/2007 |
| KR | 100766065 B1 | 10/2007 |

OTHER PUBLICATIONS

T. Aoki, et al.: "Proposal on Multi-User Precoding Considerations of IEEE 802.16m", IEEE 802.16 Broadband Wireless Acess Working Group, IEEE 802.16m-08/366 [online], May 5, 2008, pp. 1-7.

C. Windpassinger, et al.: "Precoding in Muitiantenna and Multiuser Communications", IEEE Transactions on Wireless Communications, Jul. 2004, vol. 3, No. 4, pp. 1305-1316.

B.M. Hochwald, et al.: "A Vector-Perturbation Technique for Near-Capacity Multiantenna Multiuser Communication—Part II: Perturbation", IEEE Transactions on Communications, Mar. 2005, vol. 53, pp. 537-544.

J. Kang, et al.: "An Improved Tomlinson-Harashima Precoder Reducing Transmission Power", Global Telecommunications Conference, IEEE Globecom 2008, Nov. 30, 2008, pp. 1-5.

J. Kim, et al.: "An Improved Block Tomlinson-Harashima Precoder for Multiuser MIMO Systems", ITC-CSCC, Jul. 2008, pp. 1373-1376.

S. Jung, et al.: "A New Approximation of the Receive Minimum Distance and its Application to MIMO Systems", IEICE Trans. On Communications, vol. D90-B, No. 2, pp. 385-387, Feb. 2007.

* cited by examiner

TRANSMITTING APPARATUS IN MULTIPLE INPUT MULTIPLE OUTPUT SYSTEM

CROSS-REFERENCE TO RELATED APPLICATION(S)

The present application claims priority under 35 U.S.C. §365 to International Patent Application No. PCT/KR2009/006932 filed Nov. 24, 2009, entitled "TRANSMITTING APPARATUS IN MULTIPLE INPUT MULTIPLE OUTPUT SYSTEM". International Patent Application No. PCT/KR2009/006932 claims priority under 35 U.S.C. §365 and/or 35 U.S.C. §119(a) to Korean Patent Application No. 10-2008-0122741 filed Dec. 4, 2008 and Korean Patent Application No. 10-2009-0081445 filed Aug. 31, 2009, and which are incorporated herein by reference into the present disclosure as if fully set forth herein.

TECHNICAL FIELD

The present invention relates to a multiple input multiple output (hereinafter, referred to as "MIMO") system in multiple-user environments, and in particular, to a transmitting apparatus and a transmitting method using a block Tomlinson-Harashima precoder (hereinafter, referred to as "BTHP") to remove interference caused due to multiple users in a multiple input multiple output system.

BACKGROUND ART

A basic development direction of portable Internet should be focused on faster data communication. Since it is difficult to further improve the portable Internet through a frequency bandwidth that is already nearing semi-saturation, a MIMO mechanism, which increases frequency efficiency using spatial division, will be used as a main mechanism in next-generation mobile communication.

A mobile communication system using the MIMO mechanism transmits data through independent channels that are formed among MIMO antennas of transmitting and receiving ends, thereby making it possible to obtain a data transmission rate that is higher than a system using a single antenna.

In the MIMO system, assuming that the transmitting end or the receiving end knows the information of the channels, the interference signals can be removed by a proper detection mechanism or a precoding mechanism.

The MIMO system can be applied to a cellular system that simultaneously supports multiple users. At this time, since cooperation communication between terminals cannot be generally performed, a base station transmits data to not cause inter-user interference using the precoding mechanism in a downlink.

In the MIMO system supporting multiple users, the mechanism to remove the inter-user interference depends on a dirty paper coding mechanism. The paper coding mechanism can completely remove the inter-user interference without losing transmittable data, but cannot be realistically implemented due to its complexity. Therefore, as an actual mechanism applied to remove the inter-user interference, a simplified nonlinear mechanism such as the Tomlinson Harashima precoder (THP) or a linear mechanism such as block diagonalization has been used.

The block diagonalization mechanism is relatively simple and shows good error performance, but has a drawback of a large loss of channel capacity as the number of users that are simultaneously supported increases. However, the THP mechanism has an advantage in that the loss of channel capacity is small even though the number of users increases, but has a disadvantage in that the system complexity is large and the error performance is degraded when there are a relatively small number of users.

Examples of mechanisms to improve the above-mentioned disadvantages of the block diagonalization or the THP may include a BTHP mechanism to remove the inter-user interference and a maximum likelihood (ML) receiving mechanism designed to be suitable therefore so as to improve the error performance of the THP using the MIMO antennas of the user.

The BTHP mechanism using the ML shows excellent error performance as compared to the existing THP mechanism, but still has a disadvantage in that the error performance is degraded as compared to the block diagonalization mechanism using the ML.

Therefore, a need exists for an additional optimization mechanism in order to further improve the error performance of the BTHP mechanism using the MLS.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a transmitting apparatus and a transmitting method in a multiple input multiple output system to prevent error performance of a MIMO system using a BTHP mechanism using ML from being degraded as compared to a system using a block diagonalization mechanism using ML.

Solution to Problem

In order to achieve the above objects, a transmitting apparatus in a multiple input multiple output system according to according to an exemplary embodiment of the present invention includes:

a precoder that precodes data to be transmitted to each user in a nonlinear scheme and outputs the pre-coded data; a power allocation controller that allocates and outputs power to data for each user output from the precoder; and a channel decomposition filter that obtains filter values decomposing the channels of the system in a triangular form, multiplies them by data for each user output from the power allocation controller, and then outputs them to the MIMO antennas, wherein the power allocation controller calculates power allocation parameters so that receiving minimum distances at receiving ends for each user that receives data through the MIMO antennas are the same, and allocates the calculated parameters to data for each user.

A transmitting method in a multiple input multiple output system according to another exemplary embodiment of the present invention includes:

precoding data to be transmitted to each user in a nonlinear scheme; allocating and outputting power to each precoded data for each user; and obtaining filter values decomposing the channels of the system in a triangular form, multiplying the obtained filter values by the data for each user allocated with power, and then outputting them to the MIMO antennas, wherein the allocating and outputting the power calculates power allocation parameters so that receiving minimum distances at receiving ends for each user that receives data through the MIMO antennas are the same, and allocates the calculated parameters to data for each user.

Advantageous Effects of Invention

With the present invention, when the BTHP and ML receiving mechanisms are used in the MIMO system in the multiple-user environments, it similarly controls the error performance of all the users according to power allocated to data for each user, making it possible to improve the average error performance of the system.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, a receiving end may designate a receiving station, a mobile terminal (MT), a mobile station (MS), a terminal, a subscriber station (SS), a portable subscriber station (PSS), user equipment (UE), an access terminal (AT), etc., and may include the entire or partial functions of the mobile terminal, the subscriber station, the portable subscriber station, the user equipment, etc.

In the specification, a transmitting end may designate a base station (BS), an access point (AP), a radio access station (RAS), a node B, a base transceiver station (BTS), a mobile multihop relay (MMR)-BS, etc., and may include the entire or partial functions of the AP, the RAS, the node B, the BTS, the MMR-BS, etc.

First, a MIMO system in general multiple-user environments will be described.

Figure 1:
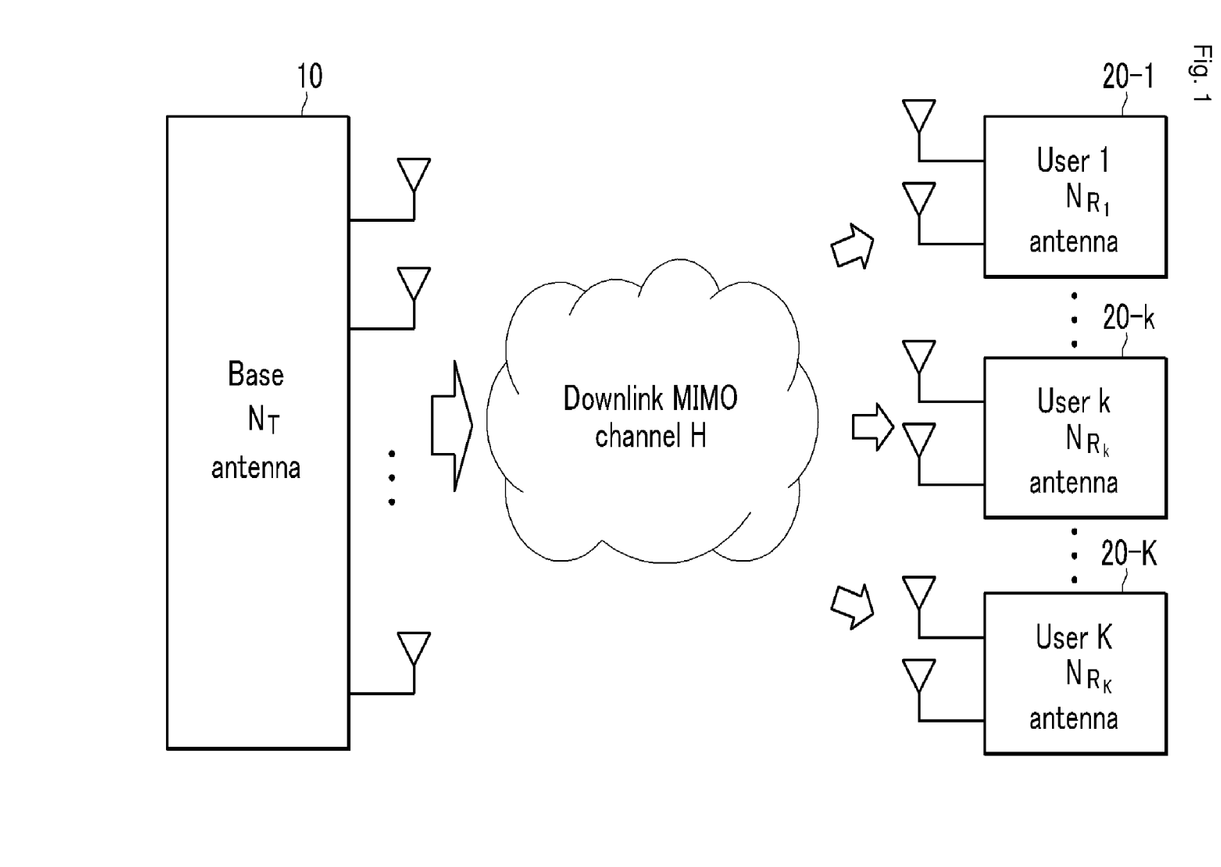
FIG. 1 is a schematic block diagram of a MIMO system in general multiple-user environments.

FIG. 1 is a schematic block diagram of a MIMO system in general multiple-user environments.

As shown in FIG. 1, the MIMO system is configured to include a base station 10 having $N_T$ transmitting antennas and K users 20-1, ..., 20-$k$, ..., 20-K each including $N_{Rk}$ receiving antennas. Herein, K users means K receiving ends or mobile stations.

That is, the base station 10 in the MIMO system transmits data to K users 20-1, ..., 20-$k$, ..., 20-K through $N_T$ transmitting antennas, and K users 20-1, ..., 20-$k$, ..., 20-K each demodulate data received through $N_{Rk}$ receiving antennas and use the demodulated data.

Figure 2:
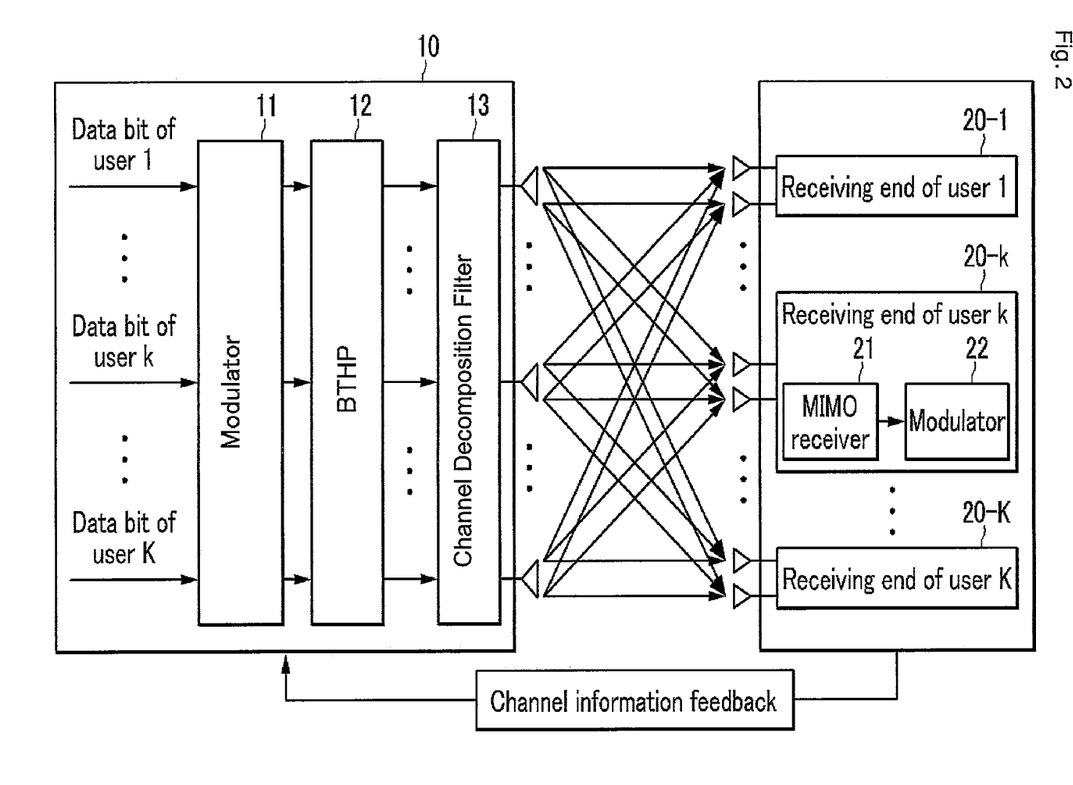
FIG. 2 is a detailed block diagram of a case where a base station shown in FIG. 1 uses a BTHP mechanism.

FIG. 2 is a detailed block diagram of a case where a base station 10 shown in FIG. 1 uses a BTHP mechanism.

Herein, K users 20-1, ..., 20-$k$, ..., 20-K have a different number of receiving antennas but have the same configuration. Therefore, only the configuration of the user K 20-$k$ will be illustrated and described.

As shown in FIG. 2, the base station 10, which is a transmitting end, modulates data bits to be transmitted to each user (20-1, ..., 20-$k$, ..., 20-K) into a transmission symbol by using a modulator 11, and then removes interference signals using a BTHP 12 based on channel information that is fed back from each user 20-1, ..., 20-$k$, ..., 20-K.

At this time, when removing inter-user interference signals using the BTHP 12 in the MIMO system in the multiple-user environments, a channel decomposition filter 13 obtains a filter F, which decomposes all the system channels into a triangular form, to be matched with the number of antennas by using a block QR (BQR) mechanism that is a generalized QR mechanism, and multiplies it by the output of the BTHP 12 and transmits it, such that each user 20-1, ..., 20-$k$, ..., 20-K receives data through a subchannel existing in a diagonal of the channel matrix without the interference signals.

K users 20-1, ..., 20-$k$, ..., 20-K each obtains the received signals. That is, a MIMO receiver 21 recovers the received signals based on the effective channel information of each user with an ML receiver method and a demodulator 22 demodulates them to generate the transmission data bits, making it possible to obtain excellent error performance.

The MIMO system according to the BTHP mechanism using the above-mentioned ML can simultaneously obtain a spatial division gain and a diversity gain as compared to the case when the user using the existing THP-based systems does not obtain the spatial diversity gain due to the MIMO antennas.

However, the MIMO system has disadvantages in that the quality of the channel occupied by each user is different according to the characteristics of the BQR mechanism, and the error performance is still degraded as compared to the block diagonalization method using the ML.

Therefore, in order to further improve the error performance of the MIMO system according to the BTHP mechanism using the ML, additional optimization mechanisms are needed.

Hereinafter, a transmitting apparatus in the MIMO system in the multiple-user environments according to an exemplary embodiment of the present invention will be described in detail with reference to the accompanying drawings.

Figure 3:
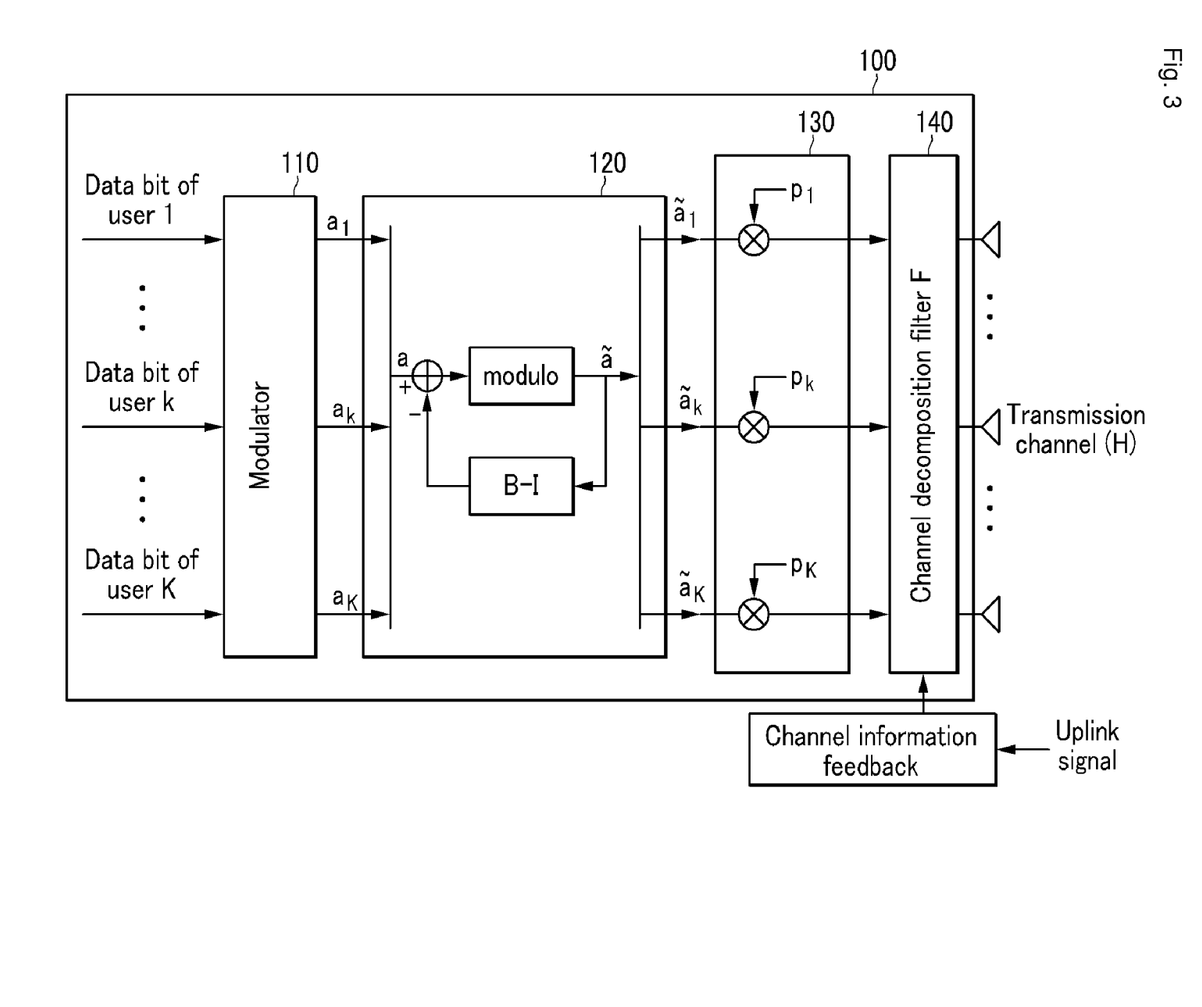
FIG. 3 is a block diagram of a transmitting apparatus in a MIMO system in multiple-user environments according to an embodiment of the present invention.

FIG. 3 is a block diagram of a transmitting apparatus in a MIMO system in multiple-user environments according to an embodiment of the present invention.

As shown in FIG. 3, a base station 100, which is a transmitting apparatus in a MIMO system according to an exemplary embodiment of the present invention, includes a modulator 110, a precoder 120 that is a BTHP, a power allocation controller 130, and a channel decomposition filter 140.

The modulator 110 modulates data bits for each user to be transmitted to mobile stations of K users according to predetermined modulation schemes, and outputs them. At this time, the modulator 110 can perform adaptation modulation that selects the modulation scheme according to the channel information that is fed back from the mobile station.

The precoder 120 precodes data output from the modulator 110, and outputs them. At this time, the precoder 120 removes and outputs the reference signals by the BTHP mechanism based on the channel information that is fed back from the mobile station of the K users for data output from the modulator 110. Herein, the precoder 120 uses the BTHP that is well known to those skilled in the art, and therefore a detailed description of the BTHP will be omitted.

The power allocation controller 130 allocates power allocation parameters to data for each user output from the precoder 120, and multiplies and outputs the allocated power allocation parameters by data for each user.

The channel decomposition filter 140 obtains a filter F that decomposes a system channel into a block triangular form, multiplies it by each data for each user output from the power allocation controller 130, and outputs it to $N_T$ transmitting antennas. Herein, the channel decomposition filter 140 obtains the filter F by decomposing the system channel into a block triangular form using the BQR mechanism, which is well known to a person of ordinary skill in the art and therefore a detailed description thereof will be omitted.

Hereinafter, a scheme in which the power allocation controller 130 calculates the power allocation parameters allocated to data for each user that is output from the precoder 120 will be described.

First, in the following description, it is assumed that the base station 100, which is a transmitting apparatus, can accurately estimate downlink channel information of users through uplink sounding signals, channel information feedback, etc., received from users that are positioned at service areas.

For convenience of explanation, it is assumed that each user has the same number (eg. $N_{Rk}$) of receiving antennas, and that the base station 100, which is the transmitting apparatus, uses the same modulation scheme.

First, all the channel matrices $$H=[H_1^T H_2^T \ldots H_K^T]^T$$

of the system are QR-decomposed according to the following Equation 1.

$$H^H = QR \quad \text{[Equation 1]}$$

Then, Q becomes a base vector obtained by sequentially orthogonalizing spaces formed by row vectors of the channel matrices, and R is a triangular matrix.

Next, the base vectors in each vector space are randomly rotated through a unitary matrix $T_k$ according to the number of user antennas in order to obtain the gain of the ML mechanism applied to the receiving end. Then, the k-th precoding matrix of the user is formed as a product of a nulling matrix and a rotating matrix, such as $F_k = Q_k T_k$.

Next, when considering the user power allocation parameters $P_k$, the effective channels observed by the BTHP 110 in order to remove inter-user interference become $P_k H_k F_k$. At this time, a sum of the power amount $$P_k^2$$

allocated to each user is equal to $KN_R$.

When the symbol vector obtained by modulating data to be transmitted to each user, that is, the symbol vector output from the modulator 110, is $$a=[a_1^T a_2^T \ldots a_K^T]^T,$$

a signal vector $$\tilde{a}_k$$

output from the BTHP 120 for the k-th user is defined by Equation 2.

$$\tilde{a}_k = a_k - (p_k H_k F_k)^{-1} \sum_{j=1}^{k-1} p_j H_k F_j \tilde{a}_j + d_k, \quad \text{[Equation 2]}$$

$$\tilde{a}_1 = a_1$$

Herein, $d_k$ represents a sign vector that is added by a modulo operation.

When the output vector $$\tilde{a}$$

of the BTHP 120 that is defined depending on Equation 2 is multiplied by the channel decomposition filter F, which passes through the channel, each user receives signals in a form of which all the inter-user interferences are removed and can use the ML receiving mechanism based on the information of the corresponding effective channel $P_k H_k F_k$.

The signal vector received at the receiving end depends on Equation 3.

$$r_k = \sum_{j=1}^{k} p_j H_k F_j \tilde{a}_j + n_k \quad \text{[Equation 3]}$$

$$= p_k H_k F_k \left( a_k - (p_k H_k F_k)^{-1} \sum_{j=1}^{k-1} p_j H_k F_j \tilde{a}_j + d_k \right) -$$

$$\sum_{j=1}^{k-1} p_j H_k F_j \tilde{a}_j + n_k$$

$$= p_k H_k F_k (a_k + d_k) + n_k$$

Herein, $n_k$ represents a noise vector at a user k side.

Assuming a sufficiently high signal-to-noise ratio, it can be assumed that the influence $d_k$ of the modulo operation can be completely removed in Equation 3. Therefore, it can be estimated that each user observes independent MIMO channels. At this time, the bit error rates (BERs) for the given effective channels $P_k H_k F_k$ is approximated depending on Equation 4.

$$P_{e|p_k H_k F_k} \approx N e Q\left(\frac{d_{min,k}}{2\sqrt{N_0/2}}\right) \quad \text{[Equation 4]}$$

Herein, Ne is anaveraae value of the number of nearest symbols, and $$d_{min,k} = \min_{a_1, a_2 \in S, a_1 \neq a_2} \|p_k H_k F_k (a_1 - a_2)\|$$

is a minimum receive distance.

Assuming that the same amount of data is transmitted to all users, the average BER performance of the system may be represented by the arithmetic mean of each user BER, and is defined by the geometric mean of each user BER as represented in Equation 5.

$$\frac{1}{K}\sum_{k=1}^{k} P_{e|p_k H_k F_k} \geq \left(\prod_{k=1}^{K} P_{e|p_k H_k F_k}\right)^{\frac{1}{K}} \quad \text{[Equation 5]}$$

Herein, an equal sign is established when BERs of all users are the same.

In Equation 4, since Ne is constant and Qfunction is a monolithic function for $d_{min,k}$, power is allocated so that the receiving minimum distances of each user are the same as in Equation 6, thereby making it possible to maximize the error performance of the system.

$$\min_{a_1, a_2 \in S, a_1 \neq a_2} \|p_1 H_1 F_1 (a_1 - a_2)\| = \quad \text{[Equation 6]}$$
$$\ldots = \min_{a_1, a_2 \in S, a_1 \neq a_2} \|p_K H_K F_K (a_1 - a_2)\|$$

However, it is very complex to determine the power allocation parameter $P_k$ satisfying Equation 6. This is because distances for all possible sets of two different transmission symbol vectors should be calculated in order to determine the receiving minimum distances of each user.

Therefore, in order to substantially determine the power allocation parameter, approximate values of the receiving minimum distances are used.

As is generally known, when the channels are given, the receiving minimum distances have singular values for the channel matrices as a lower boundary. Therefore, results such as Equation 6 can be obtained by the power allocation mechanism depending on Equation 7.

$$p_1 \lambda_{min}(H_1 F_1) = \ldots = p_K \lambda_{min}(H_K F_K) \quad \text{[Equation 7]}$$

In addition to the above-mentioned singular value, the receiving minimum distances are approximated by the geometric mean of singular values of the given channel matrices, which are equal to $N_R$ square root of determinants of the channel matrices.

Using the determinants of the channel matrices can simplify the calculation since there is no need to perform the singular value decomposition (SVD) for the channel matrices in order to obtain the singular values of the channel matrices.

In this way, the results as represented in Equation 6 can be likewise obtained by the power allocation mechanism depending on Equation 8.

$$p_1 \sqrt[N_R]{\det(H_1 F_1)} = \ldots = p_K \sqrt[N_R]{\det(H_K F_K)} \quad \text{[Equation 8]}$$

Therefore, the power allocation controller 130 calculates the power allocation parameters $P_k$, which are each allocated to data for each user output from the precoder 120, to have the values for making the receiving minimum distances of each user same as represented in Equation 6, respectively, and allocates them to data for each user, thereby making it possible to maximize the error performance of the MIMO system according to the embodiment of the present invention.

In detail, the power allocation controller 130 can be implemented to allocate the power allocation parameters to data for each user so that all values obtained by multiplying the singular values of the channel matrices for each user by the power allocation parameters allocated to each user are the same as represented in Equation 7.

To this end, the power allocation controller 130 obtains the singular values of the channel matrix for each user and calculates the power allocation parameters so that the values obtained by multiplying the singular values for each user by the power allocation parameters to be allocated to each user are the same.

Therefore, the power allocation controller 130 allocates the power allocation parameters satisfied with Equation 7 to data for each user, multiplies them by data for each user, and outputs them to the channel decomposition filter 140.

In this way, the same effect as Equation 6 is generated, such that the error performance of the MIMO system according to an exemplary embodiment of the present invention can be maximized.

As another method, the power allocation controller 130 can be implemented to allocate the power allocation parameters to data for each user so that all the values obtained by multiplying the $N_R$ square root of determinants of the channel matrices for each user by the power allocation parameters allocated to each user are the same as represented in Equation 8.

To this end, the power allocation controller 130 obtains the determinants of the channel matrices for each user and the $N_R$ square root of the obtained determinants and then calculates the power allocation parameter so that all the values obtained by multiplying the $N_R$ square root of the obtained determinants for each user by the power allocation parameters to be allocated to each user are the same.

Therefore, the power allocation controller 130 allocates the power allocation parameters as represented in Equation 8 to data for each user, multiplies them by data for each user, and outputs them to the channel decomposition filter 140.

In this way, the same effect as Equation 6 is generated, such that the error performance of the MIMO system according to an exemplary embodiment of the present invention can be maximized.

In addition to this, when there are schemes that enables the power allocation controller 130 in the base station 100 to easily obtain the values so that the receiving minimum distances of each user are the same, the power allocation parameters each corresponding to data for each user according to the corresponding schemes can be calculated and allocated.

Hereinafter, the performance of the transmitting apparatus in the MIMO system according to an exemplary embodiment of the present invention will be described with reference to FIGS. 4 and 5.

In order to compare and evaluate the performance of the transmitting apparatus according to an exemplary embodiment of the present invention with the performance of the transmitting apparatus according to the related art, a simulation was performed while changing the number of antennas and the number of users.

Figure 4:
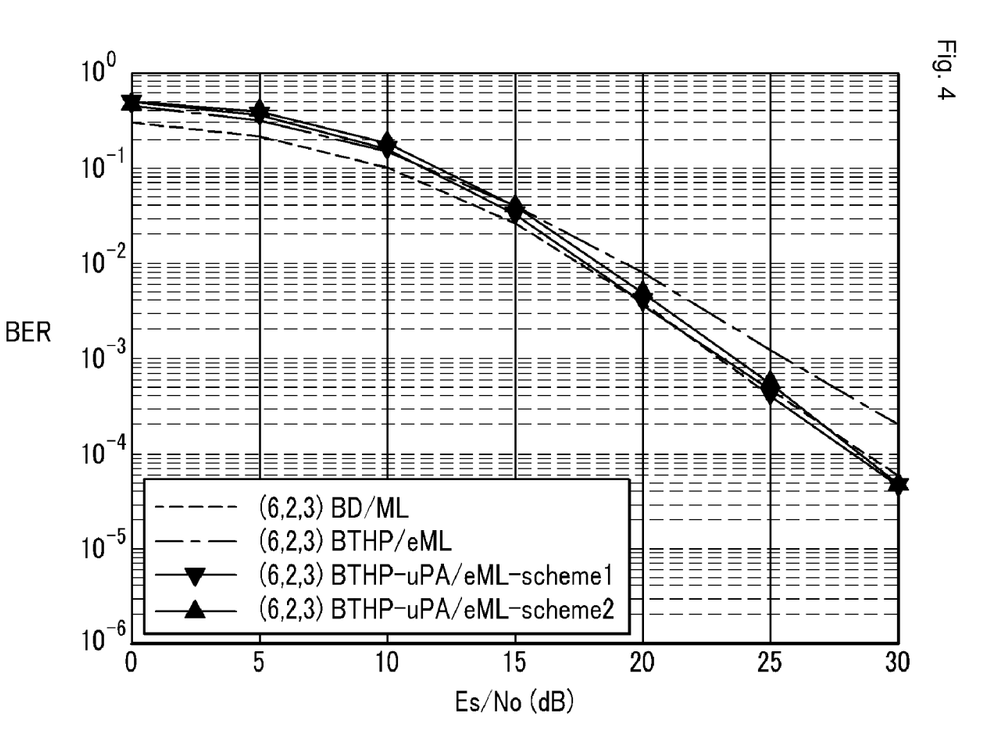
FIG. 4 is a diagram showing a system average BER graph according to an embodiment of the present invention in the case where a base station has six transmission antennas and three users each have two receiving antennas.

First, FIG. 4 shows the comparison results of the average BER performance of multiple users in the MIMO system according to the embodiment of the present invention with the block diagonalization scheme and the BTHP scheme to which power is not allocated according to the related art when a total number of transmitting antennas is 6, the number of users is 3, and the number of antennas of each user is 2.

In the following description, the horizontal axis represents the signal-to-noise ratio and the vertical axis represents the average BER of the system.

Each of the power allocation scheme 1 (scheme 1) and the power allocation scheme 2 (scheme 2) uses a mechanism of using the singular values of the channel matrices in Equation 7 and the mechanism of using the determinants of the channel matrices in Equation 8.

In this case, the BTHP mechanism using the power allocation mechanism for each user according to an exemplary embodiment of the present invention shows excellent performance at a high signal-to-noise ratio as compared to the BTHP mechanism not using the power allocation mechanism for each user.

The block diagonalization mechanism according to the related art shows excellent performance at a low signal-to-noise ratio as compared to the BTHP mechanism using the power allocation mechanism for each user according to an exemplary embodiment of the present invention.

However, as is generally known, the block diagonalization mechanism has a problem of a larger loss of channel capacity as compared with the BTHP mechanism.

Figure 5:
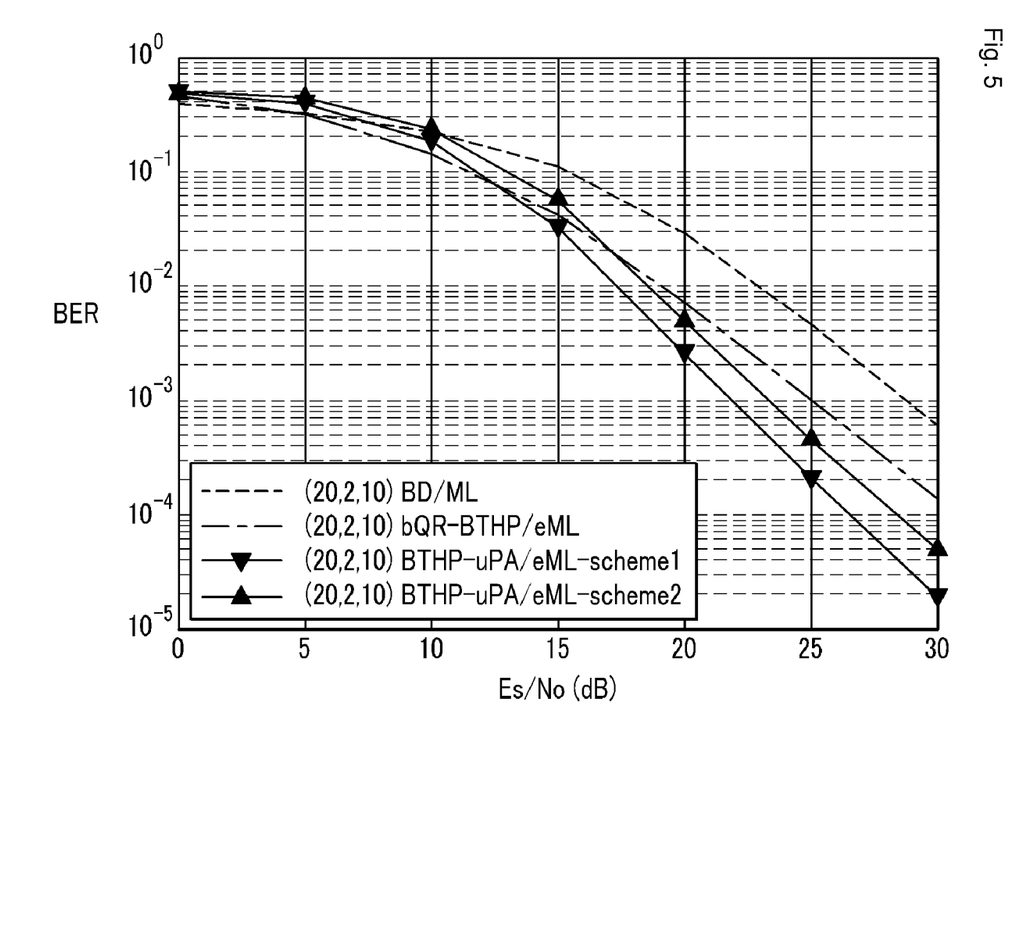
FIG. 5 is a diagram showing a system average BER graph according to an embodiment of the present invention in the case where the base station has twenty transmitting antennas and ten users each have two receiving antennas.

FIG. 5 shows the comparison results of the average BER performance of multiple users in the MIMO system according to the embodiment of the present invention with the block diagonalization scheme, and the BTHP scheme to which power is not allocated according to the related art when the total number of transmitting antennas is 20, the number of users is 10, and the number of antennas of each user is 2.

In this case, the BTHP mechanism using the power allocation mechanism for each user according to an exemplary embodiment of the present invention shows excellent performance at a high signal-to-noise ratio as compared to the BTHP mechanism not using the power allocation mechanism for each user, and also shows excellent performance at most signal-to-noise ratios as compared to the block diagonailzation mechanism according to the related art.

Unlike FIG. 4, FIG. 5 shows that the performance of the power allocation schemes 1 and 2 have a significant differences. The scheme 1 has excellent performance but is relatively complicated in a process of calculating the parameters. On the other hand, the scheme 2 is simple in a process of calculating the parameters but has relatively poor characteristics in terms of performance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmitting apparatus in a multiple input multiple output (MIMO) system, the transmitting apparatus comprising:
    a precoder configured to precode data to be transmitted to each user in a nonlinear scheme;
    a power allocation controller configured to allocate power to the data for each user output from the precoder; and
    a channel decomposition filter configured to obtain filter values for decomposing channels of the MIMO system in a triangular form, multiply the data for each user output from the power allocation controller by the filter values, and output the multiplied data for each user to MIMO antennas,
    wherein the power allocation controller is further configured to calculate power allocation parameters such that all values obtained by multiplying specific square roots of determinants of channel matrices for each user by the power allocation parameters allocated to data for each user are substantially the same.

2. The transmitting apparatus of claim 1, wherein the precoder is a block Tomlinson-Harashima precoder (BTHP) configured to remove interference signals from the data for each user based on channel information that is fed back from each user.

3. The transmitting apparatus of claim 2, further comprising a modulator configured to modulate the data for each user according to the channel information that is fed back from each user, and output the modulated data to the precoder.

4. The transmitting apparatus of claim 1, wherein the power allocation controller is further configured to multiply the power allocation parameters by the data for each user output from the precoder.

5. The transmitting apparatus of claim 1, wherein downlink channel information of each user is assumed to be estimated based on at least one of uplink sounding signals and channel information fed back from each user.

6. The transmitting apparatus of claim 1, wherein each user is assumed to have a same number of receiving antennas.

7. The transmitting apparatus of claim 1, wherein the filter values are obtained using a block QR mechanism, wherein Q is a base vector obtained by sequentially orthogonalizing spaces formed by row vectors of channel matrices, and R is a triangular matrix.

8. The transmitting apparatus of claim 1, further comprising a modulator configured to modulate the data.

9. The transmitting apparatus of claim 8, wherein the modulator is further configured to modulate the data according to predetermined modulation schemes.

10. The transmitting apparatus of claim 9, wherein the modulator is further configured to select one of the predetermined modulation schemes according to channel information fed back from each user.

11. A method for transmitting data in a multiple input multiple output (MIMO) system, the method comprising:
    precoding data to be transmitted to each user in a nonlinear scheme;
    allocating power to the precoded data for each user;
    obtaining filter values for decomposing channels of the MIMO system in a triangular form;
    multiplying the obtained filter values by the data for each user allocated with power; and
    outputting the filtered values to the MIMO antennas,
    wherein allocating the power comprises:
        obtaining determinants of channel matrices for each user;
        obtaining a specific square root of determinants for each user, the specific square root being a square root based on a number of receiving antennas for each user, and
        calculating the power allocation parameters such that all the values obtained by multiplying the specific square roots of determinants of the channel matrices for each user by the power allocation parameters allocated to data for each user are substantially the same.

12. The method of claim 11, wherein precoding the data to be transmitted to each user comprises precoding using a block Tomlinson-Harashima precoder (BTHP) scheme that removes interference signals from the data for each user based on channel information that is fed back from each user.

13. The method of claim 11, further comprising modulating the data for each user according to the channel information that is fed back from each user prior to precoding the data to be transmitted to each user.

14. The method of claim 11, wherein allocating the power further comprises:
    multiplying the power allocation parameters by the data for each user output from the precoder.

15. The method of claim 11, wherein downlink channel information of each user is assumed to be estimated based on at least one of uplink sounding signals and channel information fed back from each user.

16. The method of claim 11, wherein each user is assumed to have a same number of receiving antennas.

17. The method of claim 11, wherein the filter values are obtained using a block QR mechanism, wherein Q is a base vector obtained by sequentially orthogonalizing spaces formed by row vectors of channel matrices, and R is a triangular matrix.

18. The method of claim 11, further comprising modulating the data.

19. The method of claim 18, wherein the modulating is according to predetermined modulation schemes.

20. The method of claim 19, further comprising selecting one of the predetermined modulation schemes according to channel information fed back from each user.

\* \* \* \* \*